(12) United States Patent
Lien et al.

(10) Patent No.: US 12,625,622 B2
(45) Date of Patent: May 12, 2026

(54) SELECTIVELY DISABLING MEMORY DEVICES

(71) Applicant: Micron Technology, Inc., Boise, ID (US)

(72) Inventors: Yu-Chung Lien, San Jose, CA (US); Tomer Tzvi Eliash, Sunnyvale, CA (US); Zhenming Zhou, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 64 days.

(21) Appl. No.: 18/788,456

(22) Filed: Jul. 30, 2024

(65) Prior Publication Data

US 2026/0037156 A1 Feb. 5, 2026

(51) Int. Cl.
*G06F 3/06* (2006.01)

(52) U.S. Cl.
CPC .......... *G06F 3/0622* (2013.01); *G06F 3/0655* (2013.01); *G06F 3/0679* (2013.01)

(58) Field of Classification Search
None
See application file for complete search history.

(56) References Cited

U.S. PATENT DOCUMENTS

| | | | | |
|---|---|---|---|---|
| 8,832,402 B2* | 9/2014 | Goss | .................. | G06F 12/0246 |
| | | | | 711/163 |
| 2020/0042466 A1* | 2/2020 | Wohlschlegel | ..... | G06F 11/2094 |
| 2022/0057960 A1* | 2/2022 | Boehm | ................. | G06F 3/0655 |
| 2022/0300377 A1* | 9/2022 | Bert | ..................... | G06F 11/327 |
| 2023/0063890 A1* | 3/2023 | Boehm | ................ | G06F 3/0632 |
| 2023/0370446 A1* | 11/2023 | Shiner | .................. | H04L 9/3265 |
| 2023/0418925 A1* | 12/2023 | Kale | ..................... | G06N 3/063 |

* cited by examiner

*Primary Examiner* — Edward J Dudek, Jr.
*Assistant Examiner* — Ralph A Verderamo, III
(74) *Attorney, Agent, or Firm* — Harrity & Harrity, LLP

(57) ABSTRACT

In some implementations, a memory device may obtain, via a channel coupled to one or more memory devices of a memory system, one or more signals indicating respective power consumptions of the one or more memory devices, wherein the memory device is included in the one or more memory devices. The memory device may identify an interruption associated with the one or more signals. The memory device may determine, based on the identification of the interruption, whether a host system associated with the memory system is authorized to access the memory device. The memory device may selectively, based on the determination of whether the host system is authorized to access the memory device, perform a disablement operation on the memory device or perform one or more second commands obtained from the host system.

23 Claims, 6 Drawing Sheets

100 ⟶

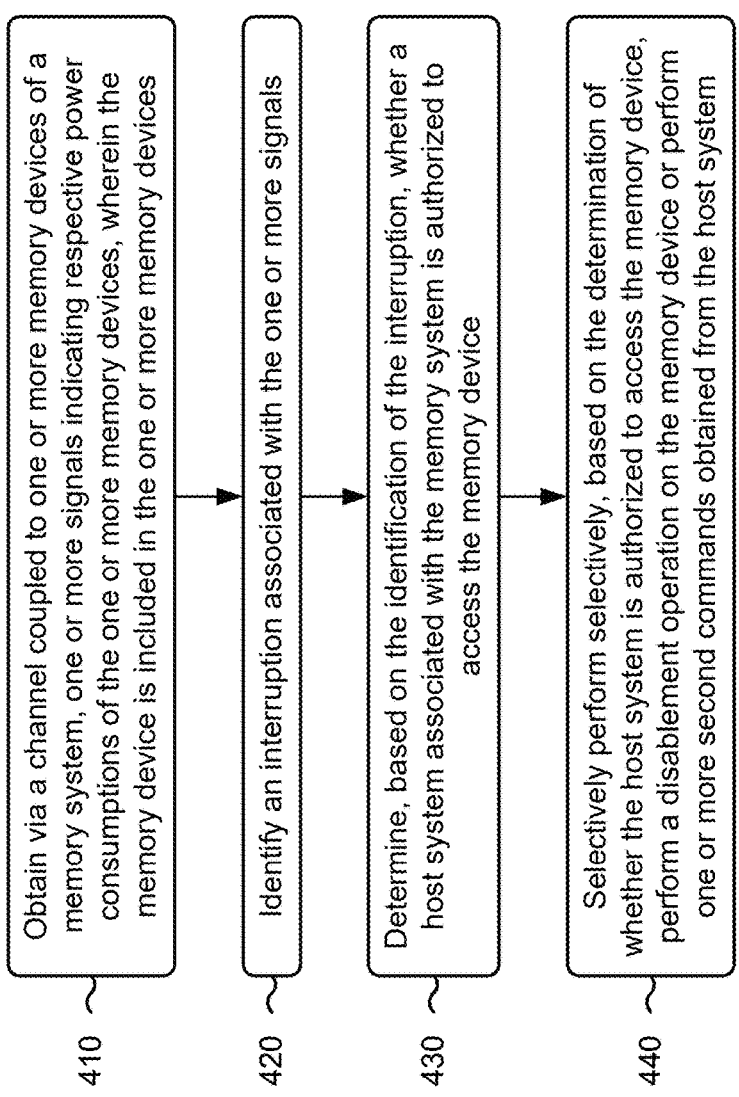

410 Obtain via a channel coupled to one or more memory devices of a memory system, one or more signals indicating respective power consumptions of the one or more memory devices, wherein the memory device is included in the one or more memory devices 420 Identify an interruption associated with the one or more signals 430 Determine, based on the identification of the interruption, whether a host system associated with the memory system is authorized to access the memory device 440 Selectively perform selectively, based on the determination of whether the host system is authorized to access the memory device, perform a disablement operation on the memory device or perform one or more second commands obtained from the host system

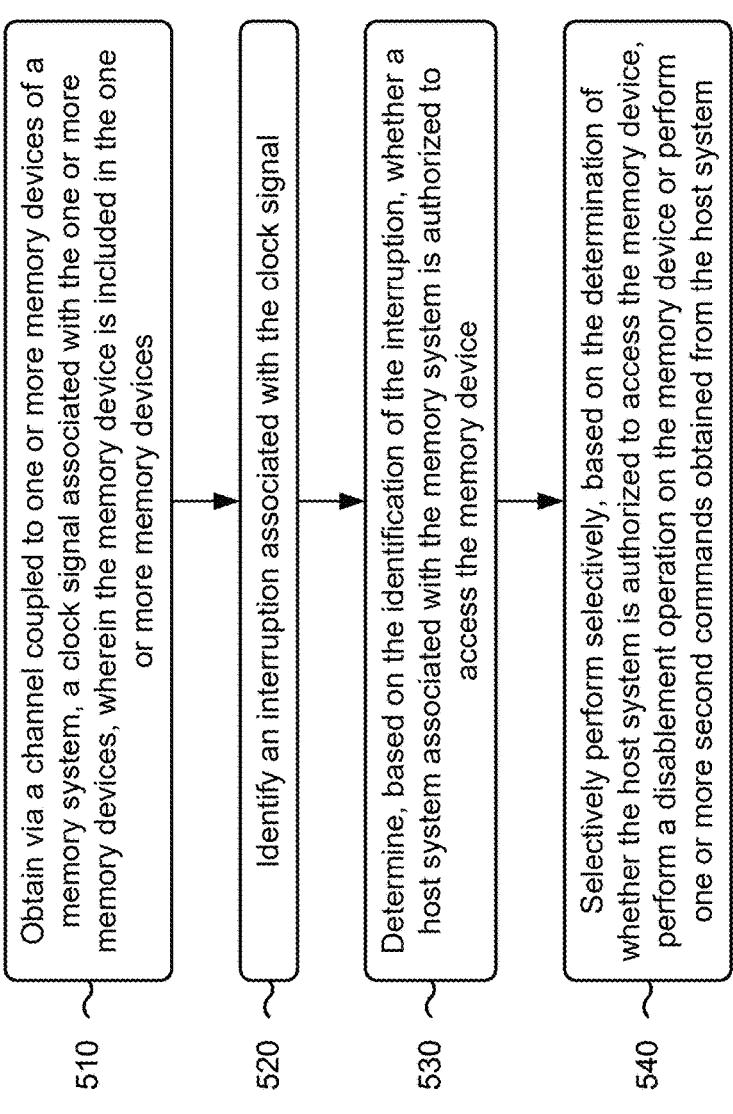

510 — Obtain via a channel coupled to one or more memory devices of a memory system, a clock signal associated with the one or more memory devices, wherein the memory device is included in the one or more memory devices 520 — Identify an interruption associated with the clock signal 530 — Determine, based on the identification of the interruption, whether a host system associated with the memory system is authorized to access the memory device 540 — Selectively perform selectively, based on the determination of whether the host system is authorized to access the memory device, perform a disablement operation on the memory device or perform one or more second commands obtained from the host system

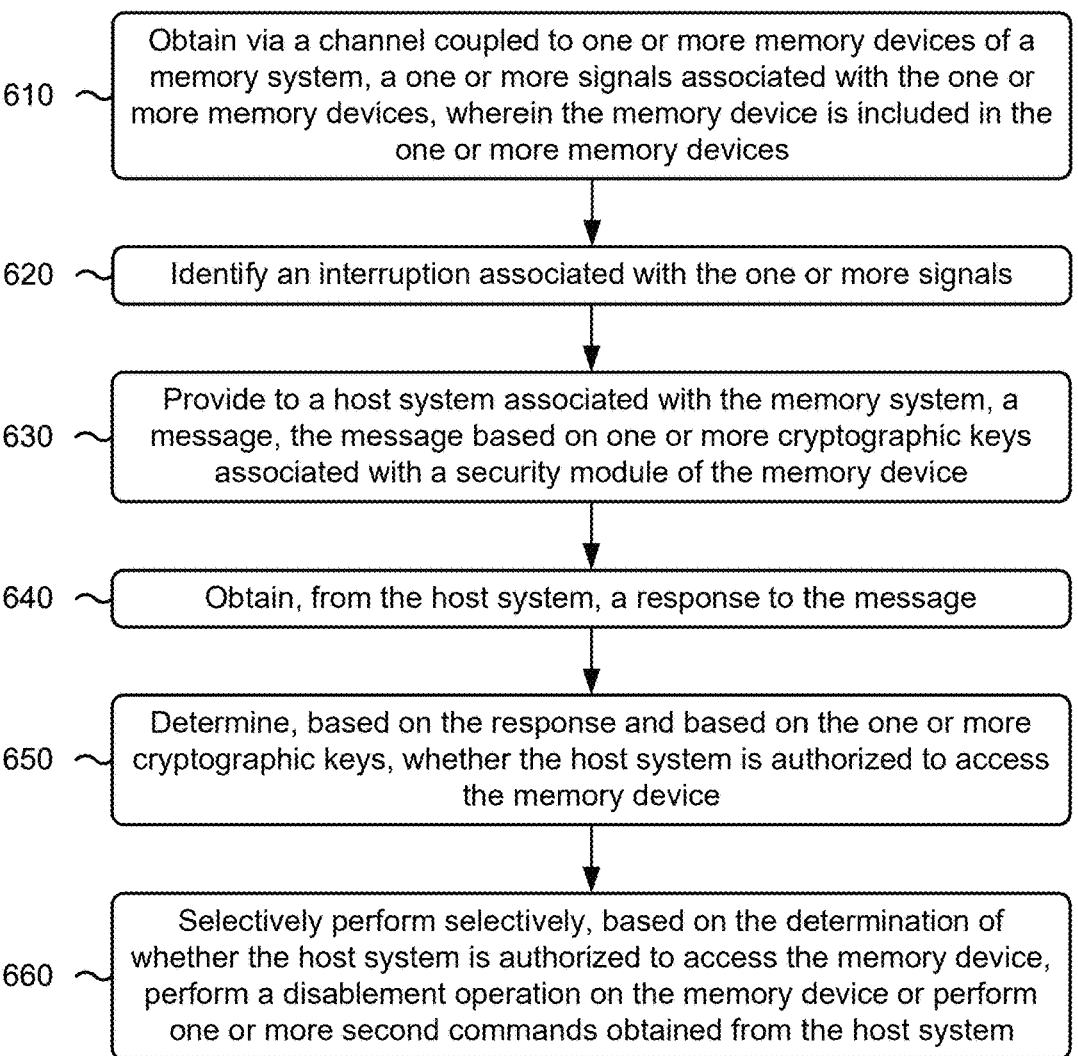

610 — Obtain via a channel coupled to one or more memory devices of a memory system, a one or more signals associated with the one or more memory devices, wherein the memory device is included in the one or more memory devices 620 — Identify an interruption associated with the one or more signals 630 — Provide to a host system associated with the memory system, a message, the message based on one or more cryptographic keys associated with a security module of the memory device 640 — Obtain, from the host system, a response to the message 650 — Determine, based on the response and based on the one or more cryptographic keys, whether the host system is authorized to access the memory device 660 — Selectively perform selectively, based on the determination of whether the host system is authorized to access the memory device, perform a disablement operation on the memory device or perform one or more second commands obtained from the host system

FIG. 6

SELECTIVELY DISABLING MEMORY DEVICES

TECHNICAL FIELD

The present disclosure generally relates to memory devices, memory device operations, and, for example, to selectively disabling memory devices.

BACKGROUND

Memory devices are widely used to store information in various electronic devices. A memory device includes memory cells. A memory cell is an electronic circuit capable of being programmed to a data state of two or more data states. For example, a memory cell may be programmed to a data state that represents a single binary value, often denoted by a binary "1" or a binary "0." As another example, a memory cell may be programmed to a data state that represents a fractional value (e.g., 0.5, 1.5, or the like). To store information, an electronic device may write to, or program, a set of memory cells. To access the stored information, the electronic device may read, or sense, the stored state from the set of memory cells.

Various types of memory devices exist, including random access memory (RAM), read only memory (ROM), dynamic RAM (DRAM), static RAM (SRAM), synchronous dynamic RAM (SDRAM), ferroelectric RAM (FeRAM), magnetic RAM (MRAM), resistive RAM (RRAM), holographic RAM (HRAM), flash memory (e.g., NAND memory and NOR memory), and others. A memory device may be volatile or non-volatile. Non-volatile memory (e.g., flash memory) can store data for extended periods of time even in the absence of an external power source. Volatile memory (e.g., DRAM) may lose stored data over time unless the volatile memory is refreshed by a power source.

BRIEF DESCRIPTION OF THE DRAWINGS

FIG. 4 is a flowchart of an example method associated with selectively disabling memory devices.

FIG. 5 is a flowchart of an example method associated with selectively disabling memory devices.

FIG. 6 is a flowchart of an example method associated with selectively disabling memory devices.

DETAILED DESCRIPTION

Figure 1:
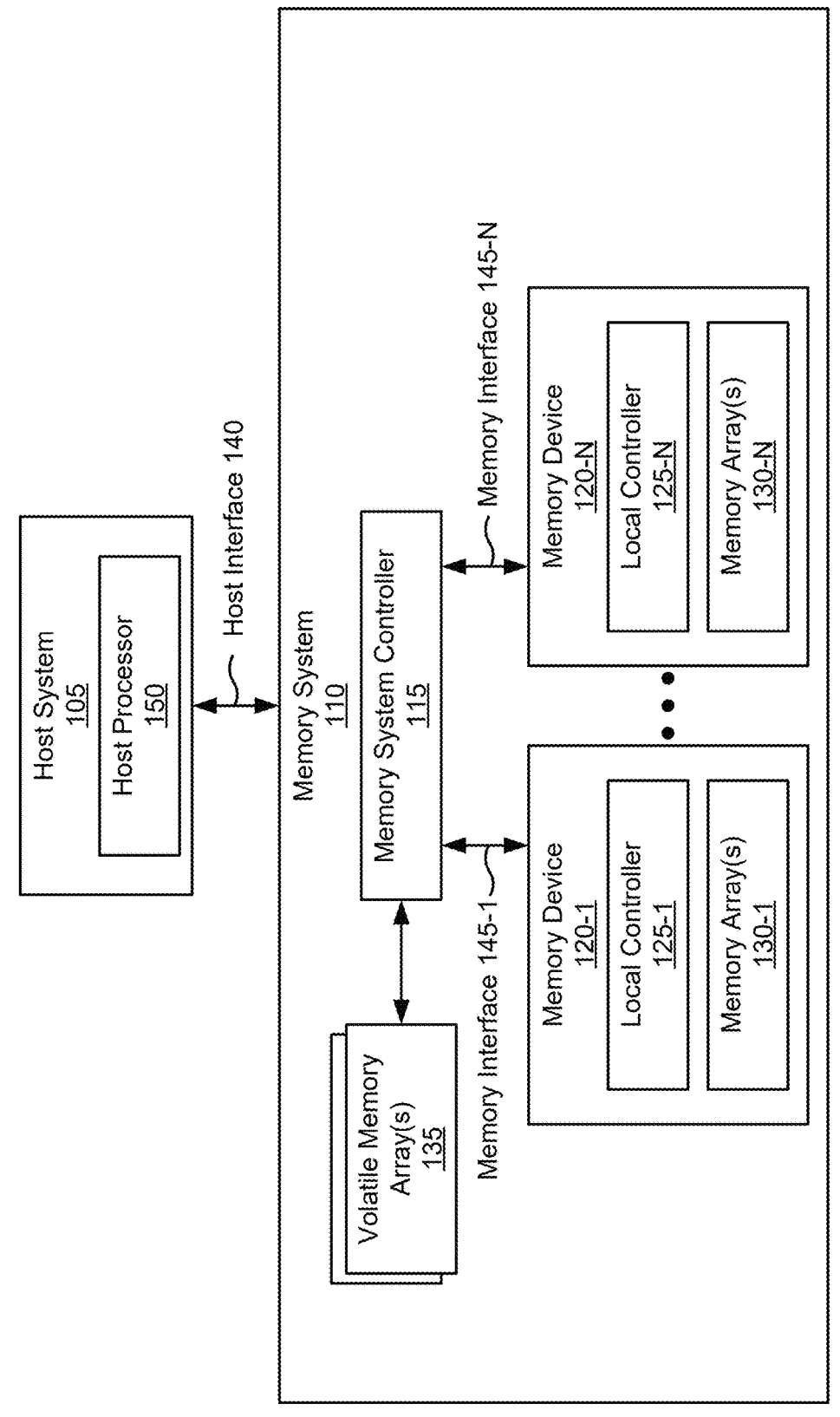
FIG. 1 is a diagram illustrating an example system capable of selectively disabling memory devices.

Products of a memory system manufacturer may be subject to unauthorized attempts from third parties to access internal aspects of a memory system. For example, as memory technology improves, unauthorized third parties, such as a competitor memory system manufacturer, may attempt to probe a memory system to observe internal signaling, such as signaling between memory devices of the memory system. Such internal signaling may reveal sensitive or otherwise classified information of the memory system, such as timing information of the memory device, operational modes supported by the memory device, and/or signaling characteristics (e.g., voltage levels and/or waveforms of signaling associated with the memory device), among other examples.

To achieve such probing, an unauthorized third party may attempt to remove a memory device from the memory system during operation of the memory system. For example, the unauthorized third party may attempt to physically remove the memory device and couple the memory device to an unauthorized host system or otherwise reroute signaling from the memory device to an unauthorized host system. The unauthorized host system may then control the memory device by imitating a legitimate host system and/or controller of the memory system (e.g., the unauthorized host system may attempt to "spoof" the memory device). For example, the unauthorized host system may issue one or more commands to the memory device. By responding to such commands, the memory device may reveal sensitive information to the unauthorized host system, which may pose a security risk to the memory system and other products of the memory system manufacturer (e.g., by revealing aspects of security protocols implemented by the memory system).

Some implementations as described herein enable selectively disabling memory devices. For example, a memory system may include one or more memory devices that may communicate via a shared channel (e.g., using cross-die communication, as described in greater detail elsewhere herein). A memory device may monitor one or more signals obtained from other memory device(s) of the memory system via the shared channel, such as one or more power management signals obtained from each of the other memory device(s) and/or a clock signal obtained from (one of) the other memory device(s). If the memory device identifies an interruption in the one or more signals, the memory device may determine that an unauthorized host system may be attempting to access the memory device.

The memory device may determine whether the host system is authorized to access the memory device. For example, the memory device may provide, and the host system may obtain, an authentication message requesting to verify the identity of the host system. The memory device may include a security module that stores one or more cryptographic keys. The memory device may use the security module to process a response to the authentication message and determine whether the host system is authorized to access the memory device. If the memory device determines that the host system is authorized to access the memory device, then the memory device may be operated by the host system. Alternatively, if the memory device determines that the host system is not authorized to access the memory device, then the memory device may perform one or more disablement operations that prevent one or more components of the memory device from functioning.

As a result, by performing the one or more disablement operations, the memory device may cause the unauthorized host system to be unable to access the memory device, thus improving the security of the memory system. In some examples, the one or more disablement operations may be non-destructive. For example, the one or more disablement operations may not cause damage to the memory device, which may allow the memory device to continue functioning (e.g., as part of communicating with an authorized host system) after performing the one or more disablement operations. Such non-destructive operations may reduce electronic waste while improving security of the memory device.

FIG. 1 is a diagram illustrating an example system 100 capable of selectively disabling memory devices. The system 100 may include one or more devices, apparatuses, and/or components for performing operations described herein. For example, the system 100 may include a host system 105 and a memory system 110. The memory system 110 may include a memory system controller 115 and one or more memory devices 120, shown as memory devices 120-1 through 120-N (where N≥1). A memory device may include a local controller 125 and one or more memory arrays 130. The host system 105 may communicate with the memory system 110 (e.g., the memory system controller 115 of the memory system 110) via a host interface 140. The memory system controller 115 and the memory devices 120 may communicate via respective memory interfaces 145, shown as memory interfaces 145-1 through 145-N (where N≥1).

The system 100 may be any electronic device configured to store data in memory. For example, the system 100 may be a computer, a mobile phone, a wired or wireless communication device, a network device, a server, a device in a data center, a device in a cloud computing environment, a vehicle (e.g., an automobile or an airplane), and/or an Internet of Things (IoT) device. The host system 105 may include a host processor 150. The host processor 150 may include one or more processors configured to execute instructions and store data in the memory system 110. For example, the host processor 150 may include a central processing unit (CPU), a graphics processing unit (GPU), a field-programmable gate array (FPGA), an application-specific integrated circuit (ASIC), and/or another type of processing component.

The memory system 110 may be any electronic device or apparatus configured to store data in memory. For example, the memory system 110 may be a hard drive, a solid-state drive (SSD), a flash memory system (e.g., a NAND flash memory system or a NOR flash memory system), a universal serial bus (USB) drive, a memory card (e.g., a secure digital (SD) card), a secondary storage device, a non-volatile memory express (NVMe) device, an embedded multimedia card (eMMC) device, a dual in-line memory module (DIMM), and/or a random-access memory (RAM) device, such as a dynamic RAM (DRAM) device or a static RAM (SRAM) device.

The memory system controller 115 may be any device configured to control operations of the memory system 110 and/or operations of the memory devices 120. For example, the memory system controller 115 may include control logic, a memory controller, a system controller, an ASIC, an FPGA, a processor, a microcontroller, and/or one or more processing components. In some implementations, the memory system controller 115 may communicate with the host system 105 and may instruct one or more memory devices 120 regarding memory operations to be performed by those one or more memory devices 120 based on one or more instructions from the host system 105. For example, the memory system controller 115 may provide instructions to a local controller 125 regarding memory operations to be performed by the local controller 125 in connection with a corresponding memory device 120.

A memory device 120 may include a local controller 125 and one or more memory arrays 130. In some implementations, a memory device 120 includes a single memory array 130. In some implementations, each memory device 120 of the memory system 110 may be implemented in a separate semiconductor package or on a separate die that includes a respective local controller 125 and a respective memory array 130 of that memory device 120. The memory system 110 may include multiple memory devices 120.

A local controller 125 may be any device configured to control memory operations of a memory device 120 within which the local controller 125 is included (e.g., and not to control memory operations of other memory devices 120). For example, the local controller 125 may include control logic, a memory controller, a system controller, an ASIC, an FPGA, a processor, a microcontroller, and/or one or more processing components. In some implementations, the local controller 125 may communicate with the memory system controller 115 and may control operations performed on a memory array 130 coupled with the local controller 125 based on one or more instructions from the memory system controller 115. As an example, the memory system controller 115 may be an SSD controller, and the local controller 125 may be a NAND controller.

A memory array 130 may include an array of memory cells configured to store data. For example, a memory array 130 may include a non-volatile memory array (e.g., a NAND memory array or a NOR memory array) or a volatile memory array (e.g., an SRAM array or a DRAM array). In some implementations, the memory system 110 may include one or more volatile memory arrays 135. A volatile memory array 135 may include an SRAM array and/or a DRAM array, among other examples. The one or more volatile memory arrays 135 may be included in the memory system controller 115, in one or more memory devices 120, and/or in both the memory system controller 115 and one or more memory devices 120. In some implementations, the memory system 110 may include both non-volatile memory capable of maintaining stored data after the memory system 110 is powered off and volatile memory (e.g., a volatile memory array 135) that requires power to maintain stored data and that loses stored data after the memory system 110 is powered off. For example, a volatile memory array 135 may cache data read from or to be written to non-volatile memory, and/or may cache instructions to be executed by a controller of the memory system 110.

The host interface 140 enables communication between the host system 105 (e.g., the host processor 150) and the memory system 110 (e.g., the memory system controller 115). The host interface 140 may include, for example, a Small Computer System Interface (SCSI), a Serial-Attached SCSI (SAS), a Serial Advanced Technology Attachment (SATA) interface, a Peripheral Component Interconnect Express (PCIe) interface, an NVMe interface, a USB interface, a Universal Flash Storage (UFS) interface, an eMMC interface, a double data rate (DDR) interface, and/or a DIMM interface.

The memory interface 145 enables communication between the memory system 110 and the memory device 120. The memory interface 145 may include a non-volatile memory interface (e.g., for communicating with non-volatile memory), such as a NAND interface or a NOR interface. Additionally, or alternatively, the memory interface 145 may include a volatile memory interface (e.g., for communicating with volatile memory), such as a DDR interface.

Although the example memory system 110 described above includes a memory system controller 115, in some implementations, the memory system 110 does not include a memory system controller 115. For example, an external controller (e.g., included in the host system 105) and/or one or more local controllers 125 included in one or more corresponding memory devices 120 may perform the operations described herein as being performed by the memory system controller 115. Furthermore, as used herein, a "controller" may refer to the memory system controller 115, a local controller 125, or an external controller. In some implementations, a set of operations described herein as being performed by a controller may be performed by a single controller. For example, the entire set of operations may be performed by a single memory system controller 115, a single local controller 125, or a single external controller. Alternatively, a set of operations described herein as being performed by a controller may be performed by more than one controller. For example, a first subset of the operations may be performed by the memory system controller 115 and a second subset of the operations may be performed by a local controller 125. Furthermore, the term "memory apparatus" may refer to the memory system 110 or a memory device 120, depending on the context.

A controller (e.g., the memory system controller 115, a local controller 125, or an external controller) may control operations performed on memory (e.g., a memory array 130), such as by executing one or more instructions. For example, the memory system 110 and/or a memory device 120 may store one or more instructions in memory as firmware, and the controller may execute those one or more instructions. Additionally, or alternatively, the controller may receive one or more instructions from the host system 105 and/or from the memory system controller 115, and may execute those one or more instructions. In some implementations, a non-transitory computer-readable medium (e.g., volatile memory and/or non-volatile memory) may store a set of instructions (e.g., one or more instructions or code) for execution by the controller. The controller may execute the set of instructions to perform one or more operations or methods described herein. In some implementations, execution of the set of instructions, by the controller, causes the controller, the memory system 110, and/or a memory device 120 to perform one or more operations or methods described herein. In some implementations, hardwired circuitry is used instead of or in combination with the one or more instructions to perform one or more operations or methods described herein. Additionally, or alternatively, the controller may be configured to perform one or more operations or methods described herein. An instruction is sometimes called a "command."

For example, the controller (e.g., the memory system controller 115, a local controller 125, or an external controller) may transmit signals to and/or receive signals from memory (e.g., one or more memory arrays 130) based on the one or more instructions, such as to transfer data to (e.g., write or program), to transfer data from (e.g., read), to erase, and/or to refresh all or a portion of the memory (e.g., one or more memory cells, pages, sub-blocks, blocks, or planes of the memory). Additionally, or alternatively, the controller may be configured to control access to the memory and/or to provide a translation layer between the host system 105 and the memory (e.g., for mapping logical addresses to physical addresses of a memory array 130). In some implementations, the controller may translate a host interface command (e.g., a command received from the host system 105) into a memory interface command (e.g., a command for performing an operation on a memory array 130).

In some implementations, one or more systems, devices, apparatuses, components, and/or controllers of FIG. 1 may be configured to obtain, via a channel coupled to one or more memory devices of a memory system, one or more signals indicating respective power consumptions of the one or more memory devices, where the memory device is included in the one or more memory devices; identify an interruption associated with the one or more signals; determine, based on the identification of the interruption, whether a host system associated with the memory system is authorized to access the memory device; and selectively, based on the determination of whether the host system is authorized to access the memory device, perform a disablement operation on the memory device or perform one or more second commands obtained from the host system.

In some implementations, one or more systems, devices, apparatuses, components, and/or controllers of FIG. 1 may be configured to obtain, via a channel coupled to one or more memory devices of a memory system, a clock signal associated with the one or more memory devices, wherein the memory device is included in the one or more memory devices; identify an interruption associated with the clock signal; determine, based on the identification of the interruption, whether a host system associated with the memory system is authorized to access the memory device; and selectively, based on the determination of whether the host system is authorized to access the memory device, perform a disablement operation on the memory device or perform one or more second commands obtained from the host system.

In some implementations, one or more systems, devices, apparatuses, components, and/or controllers of FIG. 1 may be configured to obtain, via a channel coupled to one or more memory devices of a memory system, a one or more signals associated with the one or more memory devices, wherein the memory device is included in the one or more memory devices; identify an interruption associated with the one or more signals; provide, to a host system associated with the memory system, a message, the message based on one or more cryptographic keys associated with a security module of the memory device; obtain, from the host system, a response to the message; determine, based on the response and based on the one or more cryptographic keys, whether the host system is authorized to access the memory device; and selectively, based on the determination of whether the host system is authorized to access the memory device, perform a disablement operation on the memory device or perform one or more second commands obtained from the host system.

The number and arrangement of components shown in FIG. 1 are provided as an example. In practice, there may be additional components, fewer components, different components, or differently arranged components than those shown in FIG. 1. Furthermore, two or more components shown in FIG. 1 may be implemented within a single component, or a single component shown in FIG. 1 may be implemented as multiple, distributed components. Additionally, or alternatively, a set of components (e.g., one or more components) shown in FIG. 1 may perform one or more operations described as being performed by another set of components shown in FIG. 1.

Figure 2:
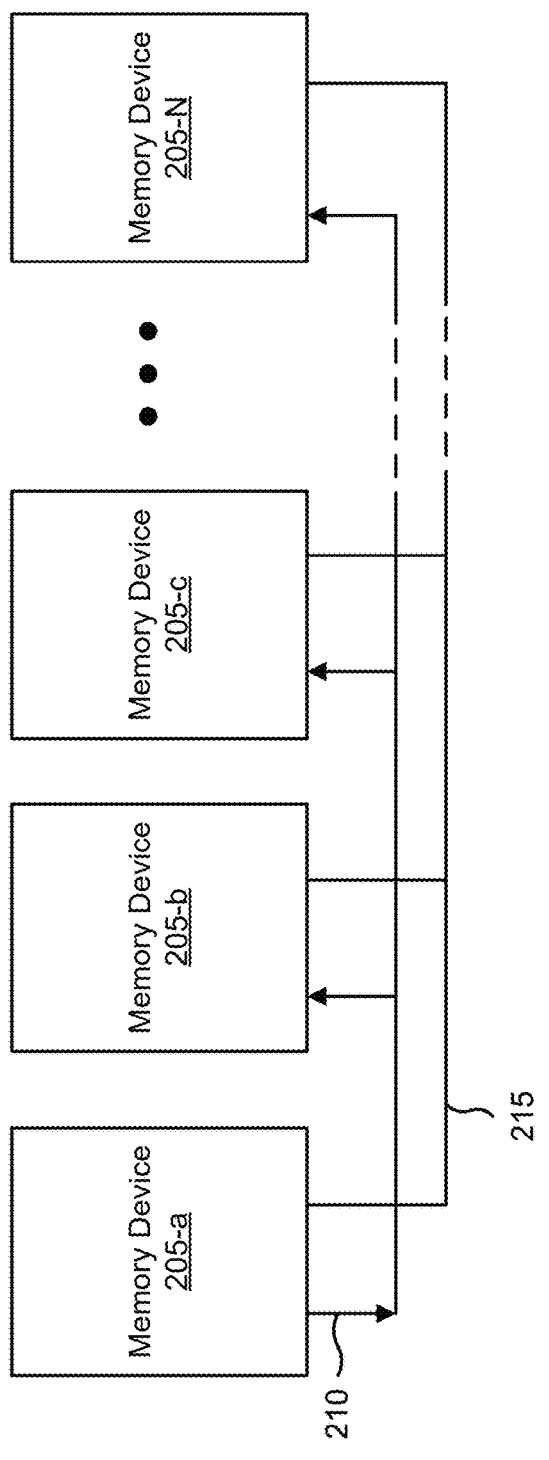
FIG. 2 is a diagram illustrating a system that supports selectively disabling memory devices.

FIG. 2 is a diagram illustrating a system 200 that supports selectively disabling memory devices. The system 200 may be an example of, or may include aspects of, the memory system 110. For example, the system 200 may include one or more memory devices 205, such as a memory device 205-*a*, a memory device 205-*b*, a memory device 205-*c*, through a memory device 205-N (where N≥1). In some examples, a memory device 205 may include a controller (e.g., a local controller 125). In some implementations, the memory device(s) 205 may be coupled to a system controller, such as a memory system controller 115. In such implementations, the memory device(s) 205 may communicate with a host system (e.g., the host system 105) via the system controller. Alternatively, the memory device(s) 205 may communicate directly with the host system (e.g., without using the system controller).

A memory device 205 may include one or more interfaces to enable direct communication with one or more other memory devices 205. For example, the system 200 may include one or more channels, such as a set of pins, pads, or other links. Such channel(s) may enable a first memory device 205 to provide signaling to a second memory device 205, without such signaling passing through another device, such as the system controller and/or a host system. Such direct communication may be referred to as "cross-module" communication and/or "cross-die" communication, and channels used to facilitate such communication may be referred to as shared channels.

For example, the system 200 may include a channel 210 coupled to each of the memory device(s) 205. The channel 210 may be used by the memory device(s) 205 to communicate one or more signals associated with a power consumption of respective memory device(s) 205. A memory device 205 may provide, using the channel 210, a message (e.g., a signal) indicating the power consumption (e.g., the rate at which the memory device uses energy). Additionally, the memory device 205 may obtain, using the channel 210 and from the other memory device(s) 205 of the system 200, respective messages indicating the respective power consumptions of the other memory device(s) 205. The memory device 205 may use the respective power consumptions of the other memory device(s) 205 to manage the total power consumption of the system 200. For example, if the memory device 205 determines that performing an operation would cause the total power consumption to exceed a power budget, then the memory device 205 may limit power consumed by performing the operation, such as by performing the operation at a lowered speed and/or delaying the operation, among other examples.

A memory device 205 may identify an attempt by an unauthorized host system to access the system 200, such as an attempt to remove the memory device 205 from the system 200 or otherwise reroute signaling associated with the memory device 205 to the unauthorized host system, using the power consumption signal(s) obtained from the other memory device(s) 205 of the system 200. For example, if the memory device 205 identifies an interruption in at least one of the power management signal(s), then the memory device 205 may determine that an unauthorized host system may be attempting to remove the memory device 205 from the system 200. Identifying an interruption in a power management signal may include monitoring the power management signal(s) to detect an unexpected waveform in the power management signal(s). For example, if, during a duration in which the memory device 205 is operating or otherwise expects to obtain the power management signal(s), the memory device 205 does not obtain at least one of the power management signal(s), then the memory device 205 may identify an interruption in the power management signal(s).

Additionally, the system 200 may include a channel 215 coupled to each of the memory device(s) 205. The channel 215 may be used to communicate one or more clock signals to the memory device(s) 205. For example, the memory device 205-*a* may generate a clock signal using an oscillator or other timing circuit of the memory device 205-*a*. The memory device 205-*a* may provide, using the channel 215, respective clock signal(s) (e.g., clock signal(s) synchronized with the clock signal generated by the memory device 205-*a*) to the other memory device(s) 205 of the system 200 (e.g., the memory device 205-*b* through the memory device

205-N). The memory device(s) 205 of the system 200 may use the clock signal(s) to synchronize operations, such as by synchronizing or otherwise organizing access operations and/or signaling provided to devices outside the system 200, such as a system controller and/or a host system.

A memory device 205 may identify an attempt by an unauthorized host system to access the system 200 using the clock signal obtained from the memory device 205-*a*. For example, if the memory device 205-*b* identifies an interruption in the clock signal, then the memory device 205-*b* may determine that an unauthorized host system may be attempting to remove the memory device 205-*b* from the system 200. Identifying an interruption in the clock signal may include monitoring the clock signal to detect an unexpected waveform in the clock signal. For example, if, during a duration in which the memory device 205-*b* is operating or otherwise expects to obtain the clock signal, the memory device 205-*b* does not obtain the clock signal, then the memory device 205-*b* may identify an interruption in the clock signal.

In some examples, a memory device 205 may include a security module to manage aspects of authenticating a host system. The security module may include dedicated hardware, such as a processor (e.g., a CPU) and memory (e.g., volatile memory, such as an SRAM array, and/or nonvolatile memory). The security module may be an example of a hardware-based root of trust (RoT). For example, the security module may be a programmable ROT, which may support updating aspects of the security module (e.g., modifying cryptographic keys, modifying cryptographic functions). Alternatively, the security module may be a fixed-function ROT, which may be operated using firmware. The memory device 205 may include an interface between the security module and other components of the memory device 205, such as a controller (e.g., a local controller 125), to support communications between the security module and the memory device 205.

The security module may store one or more cryptographic keys, such as one or more symmetric keys and/or one or more asymmetric keys (e.g., one or more public key and private key pairs). For example, as part of manufacturing the memory device 205, a manufacturer may store one or more symmetric keys to the security module (e.g., to the non-volatile memory of the security module). Host systems authorized by the manufacturer may also store the symmetric keys. The host system and the memory device 205 may encrypt and decrypt messages using the symmetric keys. Additionally, or alternatively, the memory device 205 and the host system may each store respective asymmetric key pairs. For example, the host system may store a first private key and a first public key. Additionally, the security module may store a second private key and a second public key (e.g., different than the first private key and the first public key). The host system may encrypt messages to be provided to the memory device 205 using the first private key, and may decrypt messages from the memory device 205 using the second public key. Similarly, the memory device 205 may encrypt messages to be provided to the host system using the second private key, and may decrypt messages from the host system using the first public key.

In some examples, the security module may use the cryptographic keys to verify the identity of a host system as part of power-on operations (e.g., a secure boot process) of the security module. For example, in response to, based on, or otherwise associated with being powered on, the security module may provide, and the host system may obtain, an authentication message, such as a request for a cryptographic signature and/or a cryptographic certificate (e.g., a digital certificate) of the host system.

Based on, in response to, or otherwise associated with obtaining the authentication message, the host system may provide, and the memory device 205 may obtain, a response indicating the identity of the host system. For example, the host system may provide a cryptographic certificate to the memory device 205. The host system may obtain the cryptographic certificate from a trusted source, such as a certificate authority. Accordingly, by the host system providing the certificate to the memory device 205 and/or encrypting information using a public key associated with the certificate, the memory device may verify the identity of the host system.

Additionally, or alternatively, the host system may include a cryptographic signature in the response to the authentication message. The cryptographic signature may be a value calculated by applying a cryptographic algorithm to both the contents of the response and a key stored by the host system (e.g., a symmetric key shared with the memory device 205, a private key of an asymmetric key pair). After obtaining the response, the memory device 205 may, using the security module, verify the signature, such as by applying the cryptographic algorithm to the contents of the message and a key stored by the security module (e.g., a symmetric key shared with the host system, a public key of the asymmetric key pair). By comparing the output of the cryptographic algorithm to the obtained signature, the security module may determine whether the host system is authorized to access the memory device 205. For example, if the output of the cryptographic algorithm matches (e.g., is equal to, is identical to) the obtained signature, the memory device 205 may determine that the host system is authorized to access the memory device 205. Alternatively, if the output of the cryptographic algorithm does not match the obtained signature, or if the memory device 205 does not receive a response from the host system, the memory device 205 may determine that the host system is not authorized to access the memory device 205.

As indicated above, FIG. 2 is provided as an example. Other examples may differ from what is described with regard to FIG. 2.

Figure 3:
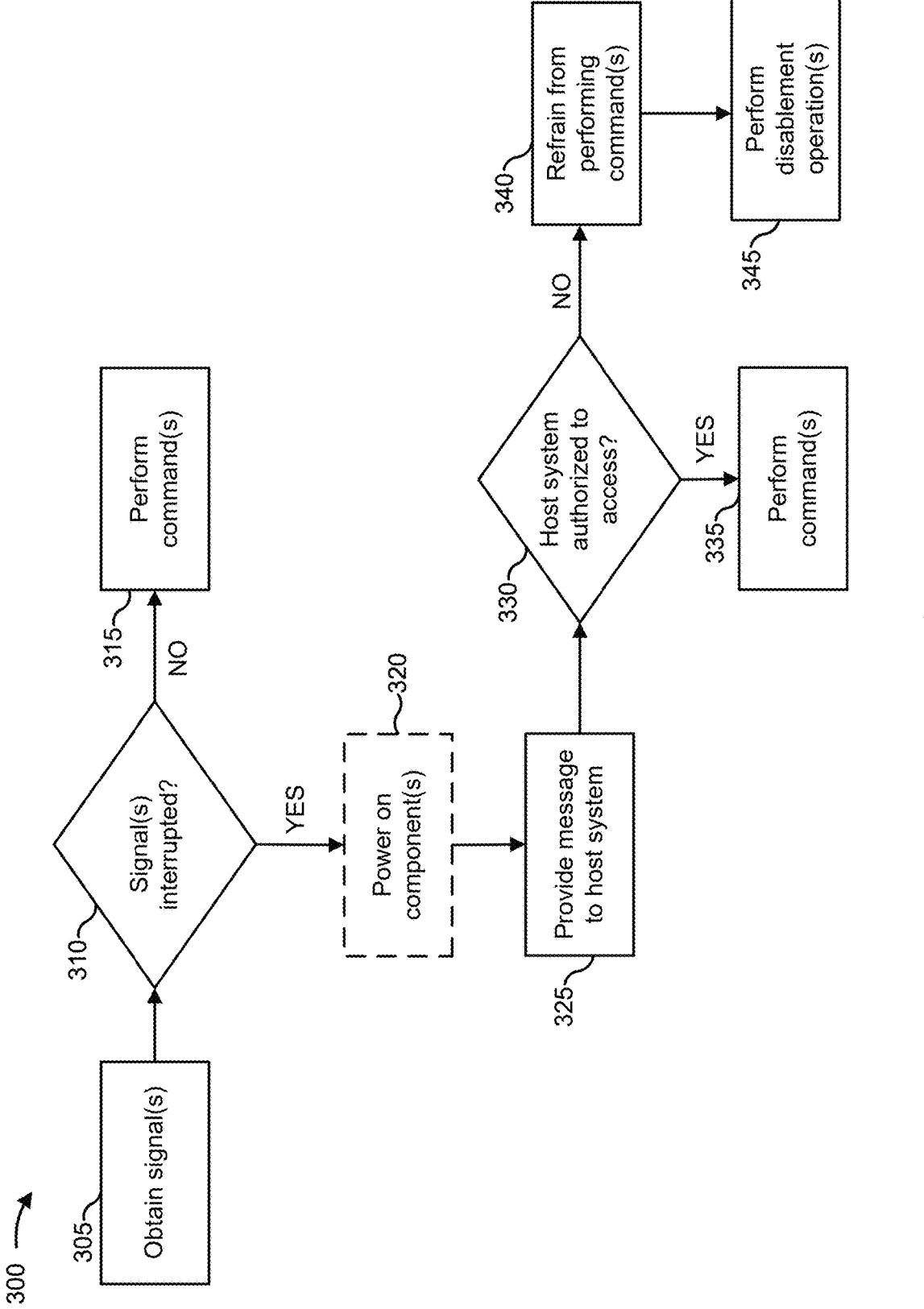
FIG. 3 is a diagram of a process that supports selectively disabling memory devices.

FIG. 3 is a diagram of a process 300 that supports selectively disabling memory devices. The operations described in connection with FIG. 3 may be performed by a memory apparatus, such as the memory system 110 and/or the system 200. Additionally, or alternatively, the operations described in connection with FIG. 3 may be performed by and/or using one or more components of the memory system 110 and/or the system 200, such as the memory system controller 115, one or more memory devices 120, one or more local controllers 125, one or more memory devices 205, the channel 210, and/or the channel 215. In some examples, aspects of the process 300 may be performed by a host system, such as the host system 105.

As illustrated by the process 300, a memory device (e.g., a memory device 120, a memory device 205) may selectively perform one or more disablement operations based on determining whether a host system is authorized to access the memory device. For example, a third party may attempt to access (e.g., probe) the memory device by removing the memory device from a package (e.g., a memory system) and coupling the memory device with an unauthorized host system. The unauthorized host system may attempt to access sensitive or otherwise classified information of the memory device. By selectively disabling the memory device, the memory device may cause the unauthorized host system to be unable to access the memory device, thus improving the security of the memory system.

For example, as shown by reference number 305, the memory device may obtain one or more signals during a first duration. The signal(s) may be directly communicated between memory device(s) of the memory system (e.g., the signal(s) may be communicated using cross-die communication). In some implementations, the signal(s) may be obtained using a shared channel of the memory device(s) of the memory system. For example, each memory device of the memory system may communicate a power management signal (e.g., using the channel 210) to the other memory device(s) of the memory system. Additionally, or alternatively, the memory device may communicate a clock signal with other memory device(s) of the memory system. For example, the memory device may generate the clock signal (e.g., using one or more timing circuits, such as one or more oscillators). The memory device may provide, using a shared channel such as the channel 215, the clock signal to the other memory device(s) to support synchronizing operations. Alternatively, the memory device many obtain the clock signal (e.g., from a separate memory device) using the shared channel.

As shown by reference number 310, the memory device may determine whether the signal(s) are interrupted (e.g., may detect an interrupt associated with the signal(s)). For example, as part of power management, the memory device may monitor the channel 210. If the memory device identifies an interruption in the power management signal(s), such as by not receiving at least one of the power management signal(s) during a second duration after (e.g., subsequent to) the first duration, then the memory device may determine that the signal(s) are interrupted. Additionally, the memory device may monitor the clock signal to determine whether the signal(s) are interrupted. For example, if the memory device identifies an interruption in the clock signal, such as by not receiving the clock signal during a third duration after (e.g., subsequent to) the first duration, then the memory device may determine that the signal(s) are interrupted.

Alternatively, if the memory device obtains the power management signal(s) from the other memory devices of the memory system during the second duration, and if the memory device obtains the clock signal during the third duration, then the memory device may determine that the signal(s) are not interrupted. Accordingly, as shown by reference number 315, the memory device may be operated by the host system. For example, the memory device may obtain one or more commands from the host system (e.g., via a system controller), and the memory device may perform the one or more commands.

If the memory device determines that the signal(s) are interrupted, then the memory device may perform one or more operations to determine whether the host system is authorized to access the memory device. In some examples, as shown by reference number 320, the memory device may power-on one or more components, such as by powering on a security module of the memory device. As shown by reference number 325, the memory device may provide a message to the host system. For example, as part of the power-on operations of the security module, the memory system may provide, and the host system may obtain, an authentication message. Based on a response to the authentication message, the memory device may determine whether the host system is authorized to access the memory device, as described in greater detail in connection with FIG. 2.

As shown by reference number 330, the memory device may selectively perform one or more disablement operations or perform one or more commands obtained from the host system based on whether the host system is authorized to access the memory device. As used herein, "selectively" performing an operation means to either perform the operation or refrain from performing the operation. For example, selectively performing an operation based on whether a condition is satisfied means that the operation is performed if the condition is satisfied and that the operation is not performed if the condition is not satisfied (or vice versa). Thus, selectively performing an operation may include determining whether to perform the operation and then either performing the operation or refraining from performing the operation based on that determination. As used herein, "selectively" performing a first operation or a second operation means to perform either the first operation or the second operation. For example, selectively performing a first operation or a second operation based on whether a condition is satisfied means that the first operation is performed if the condition is satisfied and that the second operation is performed if the condition is not satisfied (or vice versa). Thus, selectively performing a first operation or a second operation may include determining whether to perform either the first operation or the second operation and then performing either the first operation or the second operation based on that determination.

If the memory device determines that the host system is authorized to access the memory device, then, as shown by reference number 335, the memory device may be operated by the host system. For example, the memory device may obtain one or more commands from the host system (e.g., via a system controller), and the memory device may perform the one or more commands.

Alternatively, if the memory device determines that the host system is not authorized to access the memory device, then, as shown by reference number 340, the memory device may refrain from performing one or more commands obtained from the host system. For example, the memory device may override instructions obtained from the host system. Instead, as shown by reference number 345, the memory device may perform one or more disablement operations to disable or otherwise cause one or more components of the memory device to become unresponsive.

For example, the one or more disablement operations may include modifying (e.g., reducing) a supply voltage of the memory device (e.g., using a supply voltage modification circuit, such as a voltage divider, a voltage regulator, and/or a converter, among other examples). By modifying the supply voltage to be below (e.g., less than) the operating range of the memory device, the memory device may be unable to perform functions, such as access operations or other operations associated with commands obtained from the host system. Accordingly, the memory device may effectively block the unauthorized host system from accessing the memory device, which may improve the security of the memory device. Additionally, reducing the supply voltage may mitigate or eliminate damage caused by the one or more disablement operations (e.g., modifying the supply voltage may be non-destructive), which may allow the memory device to continue functioning (e.g., as part of communicating with an authorized host system) after performing the one or more disablement operations. Such non-destructive operations may reduce electronic waste while improving security of the memory device.

Additionally, the one or more disablement operations may include erasing (e.g., overwriting) metadata of the memory device. For example, the memory device may store metadata associated with accessing the memory device to one or more blocks. Such metadata may indicate parameters or other values used to operate the memory device, such as voltage levels used to program and/or read memory cells, timing information associated with accessing memory cells, voltage levels associated with communicating signals (e.g., communicating signals to other memory devices, communicating signals to a memory system controller, communicating signals to a host system), and/or timing information associated with communicating signals. In some examples, the metadata may be stored to a programmable ROM, such as an array of one or more fuses and/or one or more antifuses. In such examples, the memory device may overwrite the metadata by programming the same state (e.g., a logical 1, a logical 0) to each fuse and/or antifuse of the programmable ROM. Accordingly, such a disablement operation may render the memory device unusable (e.g., overwriting the metadata may be irreversible). By overwriting such metadata, the memory device may not be able to perform operations associated with the metadata (e.g., access operations), which may effectively block the unauthorized host system from accessing the memory device, and thus improve the security of the memory device.

Additionally, the one or more disablement operations may include applying a voltage to a communication circuit of the memory device. The communication circuit may be or may include an interface, such as an open NAND flash interface (ONFI) or other channel used to support communications of the memory device (e.g., a channel to support communications with other memory devices, a channel used to support communications with a memory system controller, a channel used to support communications with a host system). The memory device may apply a voltage that is outside (e.g., higher than) an operating range of the communication circuit. Such a voltage may damage (e.g., burn out) the communication circuit, which may render the communication circuit unusable by the memory device. Accordingly, the memory device may not be able to perform operations using the communication circuit, which may effectively block the unauthorized host system from accessing the memory device, and thus improve the security of the memory device.

Additionally, the one or more disablement operations may include applying a voltage to a timing circuit of the memory device. The timing circuit may be or may include an oscillator, such as an oscillator and/or other supporting circuitry used to generate a clock signal to manage timing aspects of the memory system. The memory device may apply a voltage that is outside (e.g., higher than) an operating range of the timing circuit. Such a voltage may damage (e.g., burn out) the timing circuit, which may render the timing circuit unusable by the memory device, which may effectively block the unauthorized host system from accessing the memory device, and thus improve the security of the memory device.

As indicated above, FIG. 3 is provided as an example. Other examples may differ from what is described with regard to FIG. 3.

FIG. 4 is a flowchart of an example method 400 associated with selectively disabling memory devices. In some implementations, a memory device (e.g., the memory device 120 and/or the memory device 205) may perform or may be configured to perform the method 400. In some implementations, another device or a group of devices separate from or including the memory device (e.g., the system 100, the system 200, the host system 105) may perform or may be configured to perform the method 400. Additionally, or alternatively, one or more components of the memory device (e.g., the local controller 125, the channel 210, the channel 215) may perform or may be configured to perform the method 400. Thus, means for performing the method 400 may include the memory device and/or one or more components of the memory device. Additionally, or alternatively, a non-transitory computer-readable medium may store one or more instructions that, when executed by the memory device (e.g., the controller 125 of the memory device), cause the memory device to perform the method 400.

As shown in FIG. 4, the method 400 may include obtaining, via a channel coupled to one or more memory devices of a memory system, one or more signals indicating respective power consumptions of the one or more memory devices, where the memory device is included in the one or more memory devices (block 410). As further shown in FIG. 4, the method 400 may include identifying an interruption associated with the one or more signals (block 420). As further shown in FIG. 4, the method 400 may include determining, based on the identification of the interruption, whether a host system associated with the memory system is authorized to access the memory device (block 430). As further shown in FIG. 4, the method 400 may include selectively, based on the determination of whether the host system is authorized to access the memory device, performing a disablement operation on the memory device or performing one or more second commands obtained from the host system (block 440).

The method 400 may include additional aspects, such as any single aspect or any combination of aspects described below and/or described in connection with one or more other methods or operations described elsewhere herein.

In a first aspect, the method 400 includes determining, using a security module of the memory device, that the host system is not authorized to access the memory device, and performing, based on the determination that the host system is not authorized to access the memory device, the disablement operation.

In a second aspect, alone or in combination with the first aspect, the method 400 includes obtaining, from the host system, the one or more second commands, and refraining, based on the determination that the host system is not authorized to access the memory device, from performing the one or more second commands.

In a third aspect, alone or in combination with one or more of the first and second aspects, the method 400 includes providing, to the host system, a message, the message based on one or more cryptographic keys associated with the security module, obtaining, from the host system, a response to the message, and determining, based on the response and based on the one or more cryptographic keys, that the host system is not authorized to access the memory device.

In a fourth aspect, alone or in combination with one or more of the first through third aspects, the security module is a hardware root of trust.

In a fifth aspect, alone or in combination with one or more of the first through fourth aspects, the method 400 includes determining, using a security module of the memory device, that the host system is authorized to access the memory device, performing, based on the determination that the host system is authorized to access the memory device, the one or more second commands, and refraining, based on the determination that the host system is authorized to access the memory device, from performing the disablement operation.

In a sixth aspect, alone or in combination with one or more of the first through fifth aspects, the one or more components are configured to obtain the one or more signals during a first duration and, to identify the interruption, the one or more components are configured to identify that a second one or more signals are not obtained, the second one or more signals indicating second respective power consumptions of the one or more memory devices during a second duration, where the second duration is after the first duration.

In a seventh aspect, alone or in combination with one or more of the first through sixth aspects, the one or more components are configured to reduce a supply voltage of the memory device such that the supply voltage does not satisfy an operation threshold of the memory device.

In an eighth aspect, alone or in combination with one or more of the first through seventh aspects, the one or more components are configured to erase metadata associated with accessing the memory device.

In a ninth aspect, alone or in combination with one or more of the first through eighth aspects, the metadata is stored to at least one of one or more fuses of the memory device or one or more antifuses of the memory device.

In a tenth aspect, alone or in combination with one or more of the first through ninth aspects, the disablement operation comprises applying a voltage to a communication circuit coupled to the memory device and coupled to a controller associated with the memory device, where the voltage exceeds an operating range of the communication circuit.

In an eleventh aspect, alone or in combination with one or more of the first through tenth aspects, the communication circuit is an open not-and (NAND) flash interface (ONFI) channel.

In a twelfth aspect, alone or in combination with one or more of the first through eleventh aspects, the disablement operation comprises applying a voltage to a timing circuit of the memory device, where the voltage exceeds an operating range of the timing circuit.

In a thirteenth aspect, alone or in combination with one or more of the first through twelfth aspects, the timing circuit is an oscillator associated with a clock signal of the memory device.

Although FIG. 4 shows example blocks of a method 400, in some implementations, the method 400 may include additional blocks, fewer blocks, different blocks, or differently arranged blocks than those depicted in FIG. 4. Additionally, or alternatively, two or more of the blocks of the method 400 may be performed in parallel. The method 400 is an example of one method that may be performed by one or more devices described herein. These one or more devices may perform or may be configured to perform one or more other methods based on operations described herein.

FIG. 5 is a flowchart of an example method 500 associated with selectively disabling memory devices. In some implementations, a memory device (e.g., the memory device 120 and/or the memory device 205) may perform or may be configured to perform the method 500. In some implementations, another device or a group of devices separate from or including the memory device (e.g., the system 100, the system 200, the host system 105) may perform or may be configured to perform the method 500. Additionally, or alternatively, one or more components of the memory device (e.g., the local controller 125, the channel 210, the channel 215) may perform or may be configured to perform the method 500. Thus, means for performing the method 500 may include the memory device and/or one or more components of the memory device. Additionally, or alternatively, a non-transitory computer-readable medium may store one or more instructions that, when executed by the memory device (e.g., the controller 125 of the memory device), cause the memory device to perform the method 500.

As shown in FIG. 5, the method 500 may include obtaining via a channel coupled to one or more memory devices of a memory system, a clock signal associated with the one or more memory devices, where the memory device is included in the one or more memory devices (block 510). As further shown in FIG. 5, the method 500 may include identifying an interruption associated with the clock signal (block 520). As further shown in FIG. 5, the method 500 may include determining, based on the identification of the interruption, whether a host system associated with the memory system is authorized to access the memory device (block 530). As further shown in FIG. 5, the method 500 may include selectively, based on the determination of whether the host system is authorized to access the memory device, performing a disablement operation on the memory device or performing one or more second commands obtained from the host system (block 540).

The method 500 may include additional aspects, such as any single aspect or any combination of aspects described below and/or described in connection with one or more other methods or operations described elsewhere herein.

In a first aspect, the one or more components are configured to obtain the clock signal during a first duration and, to identify the interruption, the one or more components are configured to identify that the clock signal is not received during a second duration after the first duration.

In a second aspect, alone or in combination with the first aspect, the method 500 includes determining, using a security module of the memory device, that the host system is not authorized to access the memory device, and performing, based on the determination that the host system is not authorized to access the memory device, the disablement operation.

In a third aspect, alone or in combination with one or more of the first and second aspects, the method 500 includes determining, using a security module of the memory device, that the host system is authorized to access the memory device, performing, based on the determination that the host system is authorized to access the memory device, the one or more second commands, and refraining, based on the determination that the host system is authorized to access the memory device, from performing the disablement operation.

Although FIG. 5 shows example blocks of a method 500, in some implementations, the method 500 may include additional blocks, fewer blocks, different blocks, or differently arranged blocks than those depicted in FIG. 5. Additionally, or alternatively, two or more of the blocks of the method 500 may be performed in parallel. The method 500 is an example of one method that may be performed by one or more devices described herein. These one or more devices may perform or may be configured to perform one or more other methods based on operations described herein.

FIG. 6 is a flowchart of an example method 600 associated with selectively disabling memory devices. In some implementations, a memory device (e.g., the memory device 120 and/or the memory device 205) may perform or may be configured to perform the method 600. In some implementations, another device or a group of devices separate from or including the memory device (e.g., the system 100, the system 200, the host system 105) may perform or may be configured to perform the method 600. Additionally, or alternatively, one or more components of the memory device (e.g., the local controller 125, the channel 210, the channel 215) may perform or may be configured to perform the method 600. Thus, means for performing the method 600 may include the memory device and/or one or more components of the memory device. Additionally, or alternatively, a non-transitory computer-readable medium may store one or more instructions that, when executed by the memory device (e.g., the controller 125 of the memory device), cause the memory device to perform the method 600.

As shown in FIG. 6, the method 600 may include obtaining via a channel coupled to one or more memory devices of a memory system, one or more signals associated with the one or more memory devices, where the memory device is included in the one or more memory devices (block 610). As further shown in FIG. 6, the method 600 may include identifying an interruption associated with the one or more signals (block 620). As further shown in FIG. 6, the method 600 may include providing, to a host system associated with the memory system, a message, the message based on one or more cryptographic keys associated with a security module of the memory device (block 630). As further shown in FIG. 6, the method 600 may include obtaining, from the host system, a response to the message (block 640). As further shown in FIG. 6, the method 600 may include determining, based on the response and based on the one or more cryptographic keys, whether the host system is authorized to access the memory device (block 650). As further shown in FIG. 6, the method 600 may include selectively, based on the determination of whether the host system is authorized to access the memory device, performing a disablement operation on the memory device or performing one or more second commands obtained from the host system (block 660).

The method 600 may include additional aspects, such as any single aspect or any combination of aspects described below and/or described in connection with one or more other methods or operations described elsewhere herein.

In a first aspect, the method 600 includes performing, based on a determination that the host system is not authorized to access the memory device, the disablement operation.

In a second aspect, alone or in combination with the first aspect, the method 600 includes identifying, using the one or more cryptographic keys, that the response does not indicate a valid cryptographic certificate.

In a third aspect, alone or in combination with one or more of the first and second aspects, the method 600 includes identifying, using the one or more cryptographic keys, that the response does not indicate a valid cryptographic signature.

In a fourth aspect, alone or in combination with one or more of the first through third aspects, the method 600 includes performing, based on a determination that the host system is authorized to access the memory device, the one or more second commands, and refraining, based on the determination that the host system is authorized to access the memory device, from performing the disablement operation.

Although FIG. 6 shows example blocks of a method 600, in some implementations, the method 600 may include additional blocks, fewer blocks, different blocks, or differently arranged blocks than those depicted in FIG. 6. Additionally, or alternatively, two or more of the blocks of the method 600 may be performed in parallel. The method 600 is an example of one method that may be performed by one or more devices described herein. These one or more devices may perform or may be configured to perform one or more other methods based on operations described herein.

In some implementations, a memory device includes one or more components configured to: obtain, via a channel coupled to one or more memory devices of a memory system, one or more signals indicating respective power consumptions of the one or more memory devices, wherein the memory device is included in the one or more memory devices; identify an interruption associated with the one or more signals; determine, based on the identification of the interruption, whether a host system associated with the memory system is authorized to access the memory device; and selectively, based on the determination of whether the host system is authorized to access the memory device, perform a disablement operation on the memory device or perform one or more second commands obtained from the host system.

In some implementations, a memory device includes one or more components configured to: obtain, via a channel coupled to one or more memory devices of a memory system, a clock signal associated with the one or more memory devices, wherein the memory device is included in the one or more memory devices; identify an interruption associated with the clock signal; determine, based on the identification of the interruption, whether a host system associated with the memory system is authorized to access the memory device; and selectively, based on the determination of whether the host system is authorized to access the memory device, perform a disablement operation on the memory device or perform one or more second commands obtained from the host system.

In some implementations, a memory device includes one or more components configured to: obtain, via a channel coupled to one or more memory devices of a memory system, a one or more signals associated with the one or more memory devices, wherein the memory device is included in the one or more memory devices; identify an interruption associated with the one or more signals; provide, to a host system associated with the memory system, a message, the message based on one or more cryptographic keys associated with a security module of the memory device; obtain, from the host system, a response to the message; determine, based on the response and based on the one or more cryptographic keys, whether the host system is authorized to access the memory device; and selectively, based on the determination of whether the host system is authorized to access the memory device, perform a disablement operation on the memory device or perform one or more second commands obtained from the host system.

The foregoing disclosure provides illustration and description but is not intended to be exhaustive or to limit the implementations to the precise forms disclosed. Modifications and variations may be made in light of the above disclosure or may be acquired from practice of the implementations described herein.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

When "a component" or "one or more components" (or another element, such as "a controller" or "one or more controllers") is described or claimed (within a single claim or across multiple claims) as performing multiple operations or being configured to perform multiple operations, this language is intended to broadly cover a variety of architectures and environments. For example, unless explicitly claimed otherwise (e.g., via the use of "first component" and "second component" or other language that differentiates components in the claims), this language is intended to cover a single component performing or being configured to perform all of the operations, a group of components collectively performing or being configured to perform all of the operations, a first component performing or being configured to perform a first operation and a second component performing or being configured to perform a second operation, or any combination of components performing or being configured to perform the operations. For example, when a claim has the form "one or more components configured to: perform X; perform Y; and perform Z," that claim should be interpreted to mean "one or more components configured to perform X; one or more (possibly different) components configured to perform Y; and one or more (also possibly different) components configured to perform Z."

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A memory device, comprising:
   one or more components configured to:
      obtain, via a channel coupled to one or more memory devices of a memory system, one or more signals indicating respective power consumptions of the one or more memory devices, wherein the memory device is included in the one or more memory devices;
      identify an interruption associated with the one or more signals;
      determine, based on the identification of the interruption, whether a host system associated with the memory system is authorized to access the memory device; and
      selectively, based on the determination of whether the host system is authorized to access the memory device, perform a disablement operation on the memory device or perform one or more second commands obtained from the host system.

2. The memory device of claim 1, wherein, to selectively perform the disablement operation or perform the one or more second commands, the one or more components are configured to:
determine, using a security module of the memory device, that the host system is not authorized to access the memory device; and
perform, based on the determination that the host system is not authorized to access the memory device, the disablement operation.

3. The memory device of claim 2, wherein the one or more components are further configured to:
obtain, from the host system, the one or more second commands; and
refrain, based on the determination that the host system is not authorized to access the memory device, from performing the one or more second commands.

4. The memory device of claim 2, wherein, to determine that the host system is not authorized to access the memory device, the one or more components are configured to:
provide, to the host system, a message, the message based on one or more cryptographic keys associated with the security module;
obtain, from the host system, a response to the message; and
determine, based on the response and based on the one or more cryptographic keys, that the host system is not authorized to access the memory device.

5. The memory device of claim 2, wherein the security module is a hardware root of trust.

6. The memory device of claim 1, wherein, to selectively perform the disablement operation or perform the one or more second commands, the one or more components are configured to:
determine, using a security module of the memory device, that the host system is authorized to access the memory device;
perform, based on the determination that the host system is authorized to access the memory device, the one or more second commands; and
refrain, based on the determination that the host system is authorized to access the memory device, from performing the disablement operation.

7. The memory device of claim 1, wherein the one or more components are configured to obtain the one or more signals during a first duration, and wherein, to identify the interruption, the one or more components are configured to:
identify that a second one or more signals are not obtained, the second one or more signals indicating second respective power consumptions of the one or more memory devices during a second duration, wherein the second duration is after the first duration.

8. The memory device of claim 1, wherein the disablement operation comprises reducing a supply voltage of the memory device such that the supply voltage does not satisfy an operation threshold of the memory device.

9. The memory device of claim 1, wherein the disablement operation comprises erasing metadata associated with accessing the memory device.

10. The memory device of claim 9, wherein the metadata is stored to at least one of one or more fuses of the memory device or one or more antifuses of the memory device.

11. The memory device of claim 1, wherein the disablement operation comprises applying a voltage to a communication circuit coupled to the memory device and coupled to a controller associated with the memory device, wherein the voltage exceeds an operating range of the communication circuit.

12. The memory device of claim 11, wherein the communication circuit is an open not-and (NAND) flash interface (ONFI) channel.

13. The memory device of claim 1, wherein the disablement operation comprises applying a voltage to a timing circuit of the memory device, wherein the voltage exceeds an operating range of the timing circuit.

14. The memory device of claim 13, wherein the timing circuit is an oscillator associated with a clock signal of the memory device.

15. A memory device, comprising:
one or more components configured to:
obtain, via a channel coupled to one or more memory devices of a memory system, a clock signal associated with the one or more memory devices, wherein the memory device is included in the one or more memory devices;
identify an interruption associated with the clock signal;
determine, based on the identification of the interruption, whether a host system associated with the memory system is authorized to access the memory device; and
selectively, based on the determination of whether the host system is authorized to access the memory device, perform a disablement operation on the memory device or perform one or more second commands obtained from the host system.

16. The memory device of claim 15, wherein the one or more components are configured to obtain the clock signal during a first duration, and wherein, to identify the interruption, the one or more components are configured to:
identify that the clock signal is not received during a second duration after the first duration.

17. The memory device of claim 15, wherein, to selectively perform the disablement operation or perform the one or more second commands, the one or more components are configured to:
determine, using a security module of the memory device, that the host system is not authorized to access the memory device; and
perform, based on the determination that the host system is not authorized to access the memory device, the disablement operation.

18. The memory device of claim 15, wherein, to selectively perform the disablement operation or perform the one or more second commands, the one or more components are configured to:
determine, using a security module of the memory device, that the host system is authorized to access the memory device;
perform, based on the determination that the host system is authorized to access the memory device, the one or more second commands; and
refrain, based on the determination that the host system is authorized to access the memory device, from performing the disablement operation.

19. A memory device, comprising:
one or more components configured to:
obtain, via a channel coupled to one or more memory devices of a memory system, one or more signals associated with the one or more memory devices, wherein the memory device is included in the one or more memory devices;
identify an interruption associated with the one or more signals;

provide, to a host system associated with the memory system, a message, the message based on one or more cryptographic keys associated with a security module of the memory device;

obtain, from the host system, a response to the message;

determine, based on the response and based on the one or more cryptographic keys, whether the host system is authorized to access the memory device; and selectively, based on the determination of whether the host system is authorized to access the memory device, perform a disablement operation on the memory device or perform one or more second commands obtained from the host system.

20. The memory device of claim 19, wherein, to selectively perform the disablement operation or perform the one or more second commands, the one or more components are configured to:

perform, based on a determination that the host system is not authorized to access the memory device, the disablement operation.

21. The memory device of claim 20, wherein, to determine that the host system is not authorized to access the memory device, the one or more components are configured to:

identify, using the one or more cryptographic keys, that the response does not indicate a valid cryptographic certificate.

22. The memory device of claim 20, wherein, to determine that the host system is not authorized to access the memory device, the one or more components are configured to:

identify, using the one or more cryptographic keys, that the response does not indicate a valid cryptographic signature.

23. The memory device of claim 20, wherein, to selectively perform the disablement operation or perform the one or more second commands, the one or more components are configured to:

perform, based on a determination that the host system is authorized to access the memory device, the one or more second commands; and refrain, based on the determination that the host system is authorized to access the memory device, from performing the disablement operation.

* * * * *